(12) United States Patent
Delmas

(10) Patent No.: US 12,084,811 B2
(45) Date of Patent: Sep. 10, 2024

(54) LIGNOCELLULOSIC BIOMASS BASED PROCESS FOR PRODUCTION OF LIGNINS AND SYNGAS, AND ELECTRICITY PRODUCTION EFFICIENT SYNGAS

(71) Applicant: Société BIOEB, Auzeville-Tolosane (FR)

(72) Inventor: Michel Delmas, Auzeville-Tolosane (FR)

(73) Assignee: Société Bioeb, Auzeville-Tolosane (FR)

( * ) Notice: Subject to any disclaimer, the term of this patent is extended or adjusted under 35 U.S.C. 154(b) by 0 days.

(21) Appl. No.: 16/969,671

(22) PCT Filed: Feb. 14, 2019

(86) PCT No.: PCT/EP2019/053622
§ 371 (c)(1),
(2) Date: Aug. 13, 2020

(87) PCT Pub. No.: WO2019/158624
PCT Pub. Date: Aug. 22, 2019

(65) Prior Publication Data
US 2021/0009908 A1    Jan. 14, 2021

(30) Foreign Application Priority Data
Feb. 16, 2018    (EP) .................................... 18157075

(51) Int. Cl.
*D21C 3/00*    (2006.01)
*C08B 37/00*    (2006.01)
(Continued)

(52) U.S. Cl.
CPC .......... *D21C 3/003* (2013.01); *C08B 37/0057* (2013.01); *C08H 6/00* (2013.01);
(Continued)

(58) Field of Classification Search
CPC ...... D21C 3/003; D21C 11/0007; D21C 11/10
See application file for complete search history.

(56) References Cited

U.S. PATENT DOCUMENTS

| | | | |
|---|---|---|---|
| 7,402,224 B1 | 7/2008 | Avignon et al. | |
| 2004/0035537 A1* | 2/2004 | Delmas .................. | D21C 9/101 162/76 |

(Continued)

OTHER PUBLICATIONS

Li et al. (Chemical Engineering Journal 179, 2012, 80-89) (Year: 2012).*

(Continued)

*Primary Examiner* — Liam J Heincer
(74) *Attorney, Agent, or Firm* — Greer, Burns & Crain, Ltd.

(57) ABSTRACT

A process for production of lignins and synthetic gas including the steps of extracting lignins and hemicellulose by putting solid Lignocellulosic Raw Material in contact with a mixture of water and formic acid at atmospheric pressure and at a temperature between 80° C. and 110° C.; fractionating, the primary solid fraction and the primary liquid fraction; separating the lignins from the intermediate liquid fraction; and gasifying at least part of said primary solid fraction and/or at least part of said residual liquid fraction for producing synthetic gas.

12 Claims, 1 Drawing Sheet

(51) Int. Cl.

| | | |
|---|---|---|
| *C08H 7/00* | (2011.01) | |
| *C10J 3/72* | (2006.01) | |
| *D21C 3/04* | (2006.01) | |
| *D21C 3/20* | (2006.01) | |
| *D21C 9/02* | (2006.01) | |
| *D21C 9/18* | (2006.01) | |
| *D21C 11/00* | (2006.01) | |
| *D21H 11/02* | (2006.01) | |

(52) U.S. Cl.
CPC ............... *C10J 3/72* (2013.01); *D21C 3/04* (2013.01); *D21C 3/20* (2013.01); *D21C 9/02* (2013.01); *D21C 9/18* (2013.01); *D21C 11/0007* (2013.01); *D21H 11/02* (2013.01); *C10J 2300/092* (2013.01)

(56) References Cited

U.S. PATENT DOCUMENTS

| | | | |
|---|---|---|---|
| 2009/0065158 A1* | 3/2009 | Benjelloun Mlayah | D21C 3/20 162/239 |
| 2010/0285553 A1* | 11/2010 | Delmas | C08H 6/00 435/162 |
| 2010/0317749 A1* | 12/2010 | Kukkonen | C02F 1/00 210/600 |
| 2012/0202260 A1 | 8/2012 | Maclachlan | |
| 2015/0167969 A1* | 6/2015 | Retsina | C10L 9/083 435/165 |
| 2016/0096985 A1* | 4/2016 | Knight | C09J 197/005 428/355 CP |
| 2016/0264412 A1* | 9/2016 | Neumann | C10K 3/06 |
| 2016/0369033 A1 | 12/2016 | Delmas et al. | |
| 2017/0096558 A1* | 4/2017 | Slaghek | C08L 97/002 |
| 2017/0152533 A1* | 6/2017 | Kurek | C12N 9/0008 |
| 2017/0247835 A1* | 8/2017 | Leschinsky | D21C 11/0007 |
| 2018/0044363 A1* | 2/2018 | Armiger | C08H 6/00 |
| 2019/0055122 A1* | 2/2019 | Goetsch | C10J 3/48 |
| 2021/0002824 A1* | 1/2021 | Delmas | D21H 11/02 |
| 2021/0003073 A1* | 1/2021 | Delmas | C08H 8/00 |
| 2021/0009908 A1* | 1/2021 | Delmas | D21C 3/003 |
| 2021/0079123 A1* | 3/2021 | Benjelloun Mlayah | C08L 5/14 |

OTHER PUBLICATIONS

International Search Report; priority document.
Zhang et al., "Organosoly Pretreatment of Plant Biomass for Enhanced Enzymatic Saccharification" vol. 18, 2016, pp. 360-381.
Özdencki et al., "A Novel Biorefinery Integration Concept for Lignocellulosic Biomass" Energy Conversion and Management, vol. 149, Apr. 17, 2017, pp. 974-987.
Gu et al., "Life-Cycle GHG Emissions of Electricity from Syngas Prodoced by Pyrolyzing Woody Biomass" Proceedings of the 58th International Convention of Society of Wood Science and Technology, Jun. 2015, pp. 376-389.

* cited by examiner

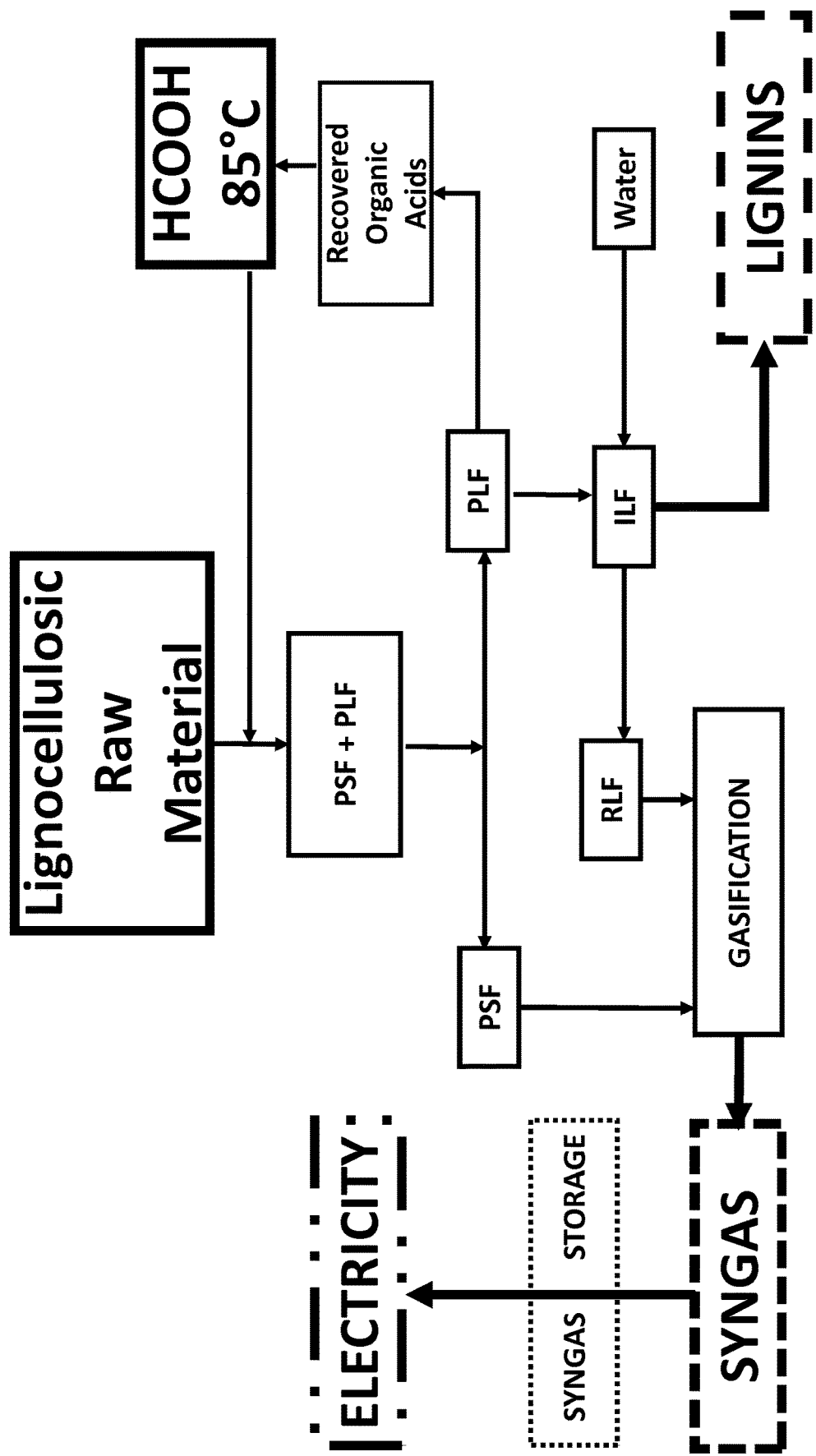

LIGNOCELLULOSIC BIOMASS BASED PROCESS FOR PRODUCTION OF LIGNINS AND SYNGAS, AND ELECTRICITY PRODUCTION EFFICIENT SYNGAS

CROSS-REFERENCES TO RELATED APPLICATIONS

This application claims the benefit of the International Application No. PCT/EP2019/053622, filed on Feb. 14, 2019, and of the European patent application No. 18157075.5 filed on Feb. 16, 2018, the entire disclosures of which are incorporated herein by way of reference.

FIELD OF THE INVENTION

The invention relates to a process for production of non-oxidized, non-degraded and uncombined lignins and of energy, and of synthetic gas, starting from a lignocellulosic biomass.

The invention also relates to a lignocellulosic biomass based process for production of electricity by using synthetic gas, and to an energy production efficient synthetic gas.

BACKGROUND OF THE INVENTION

To date, and without considering the direct combustion of biomass, the main attempt to produce energy from plant biomass has been to produce biofuels such as bioethanol and other types of biofuels.

Such biofuels have appeared attractive, in particular, in trying to reduce the carbon dioxide emissions of automotive vehicles equipped with combustion engines, by replacing "fossil" fuels.

Fuels derived from plant biomass also emit carbon dioxide, but the carbon thus released was already present in the atmosphere.

Biofuels have thus appeared attractive from the point of view of carbon dioxide emissions.

In particular, the different technologies for the production of liquid biofuels—whether it is the transformation of lignocellulosic biomass by enzymatic hydrolysis or the thermochemical pathway—have low yields in terms of volume of production and in terms of energy balance. The overall energy balance of ethanol production by the conventional biochemical pathway can be penalized by the necessary energy consumption associated with the cultivation of dedicated plants as well as by the energy consumption during the distillation operations.

In addition, in this sector, only the sugars contained in the plants are used for the production of biofuels and therefore for the production of energy.

Also, the costs of the enzymes do not permit the reaching of a sufficient economical balance—that is continually affected in function of the price of the crude oil.

In the thermochemical pathway, all the components of the biomass are used for production of the biofuels and the overall energy balance might be better, but the overall economic balance remains very low.

Thus, no solution has emerged for industrial mass production of biofuels that would be satisfactory with regard to the different energy, economic and global ecological balances.

At the same time, it has become essential to develop all types of green energy production, in particular green electricity, i.e., energies not using fossil fuels nor based on the nuclear industry.

These developments are also consistent with the evolution of the concept of motorized vehicles whose major trend in their mode of propulsion and their energy source consists nowadays in a total "electrification", or partial electrification through hybrid motorizations.

Such a lignocellulosic vegetable raw material is, for example, available in mass when one considers the lignocellulosic residues in logging and in the production of palm or palm trees, or the production of rice straw and cereal straw at large, or the bagasse in the sugar industry. In these two cases, a very abundant raw material is available for carrying out the process according to the invention which, to date, finds no profitable industrial use and under environmentally acceptable conditions for the production of energy, and for example for the production "in situ" of electricity.

Moreover, for various reasons, it has also become necessary in the polymer industry to move towards a progressive replacement of products derived from the petroleum industry (i.e., from petrochemicals) by products derived from biomass (green chemistry).

In such a context, it has been proposed in US-A1-2012/0202260 a process for concurrent recovery of lignin derivatives and synthetic gas (syngas) from a lignocellulosic feedstock according to a "Hybrid bio refining and gasification of lignocellulosic feedstocks". However, after separation of the lignins and gasification of the "solids streams" and of the "Semi-solid and solid wastes" to produce syngas using conventional gasification equipment, it is proposed to process the syngas in order to produce various types of fuels such as Biodiesel, Butanol, Ethanol, Methanol, etc.

More precisely, this document proposes the recovery of lignin derivatives from black liquor streams recovered from organosolv pulping of lignocellulosic feedstocks, recovery and recycling of at least a portion of the organic solvent and gasification of the remaining stillage concurrent with gasification of the cellulosic solids recovered from the organosolv pulping process followed by concurrent conversion of at least a portion of the syngas into short chain alcohols and other chemical streams. It is also within the scope of the teachings of this document to further concurrently recover chemical components from the de-lignified liquor stream prior to gasification of the stillage.

Syngas, or synthesis gas, is a fuel gas mixture consisting primarily of hydrogen, carbon monoxide, and very often some carbon dioxide.

Conversion of biomass to syngas is typically low-yield.

Electricity generation is the process of generating electric power from sources of primary energy. For electric utilities in the electric power industry, it is the first stage in the delivery of electricity to end users, the other stages being transmission, distribution, energy storage and recovery, using pumped-storage methods.

A characteristic of electricity is that it is not a primary energy freely present in nature in remarkable amounts and it must be produced. Production is carried out in power plants. Electricity is most often generated at a power station by electromechanical generators, primarily driven by heat engines fueled by combustion or nuclear fission, but also by other means such as the kinetic energy of flowing water and wind. Other energy sources include solar photovoltaics and geothermal power.

Theoretically, syngas is composed of equimolar amounts of hydrogen $H_2$ and carbon monoxide $CO$ and carbon monoxide.

According to prior art techniques, the syngas obtained from gasification of lignocellulosic biomass is composed of impurities as dust, tar, halogen and alkali compounds with inorganic impurities, being hydrogen sulfide H2S, ammonium NH3, hydrogen chloride HCl, methane and other light hydrocarbon C2H6 contaminants of catalysts in downstream processes and specific cleaning operations and process are required to remove such contaminants.

A time consuming and very expensive gas cleaning is thus required to remove contaminants and provide a syngas within specifications for downstream processes and syngas utilization, while a gas conditioning system is required to eliminate main gas compounds and adjust the H2/CO ratio.

The main steps here are reforming of hydrocarbons, CO-shift to adjust the H2/CO ratio and removal of CO2.

After such time consuming and expensive gas treatment by cleaning and conditioning, syngas obtained from lignocellulosic biomass is chemically similar (CO, H2) to syngas derived from fossil sources and can replace its fossil equivalent in all applications.

Thus, there is a global need for a process and a pathway for the treatment of lignocellulosic biomass, and, in particular, wastes from agricultural production and from the forest industry, which makes it possible to valorize a part of the components of the lignocellulosic biomass in polymers industry, and the other components through the direct production of energy, for example production of electrical energy, with optimum energy, economic and ecological balances.

SUMMARY OF THE INVENTION

The invention proposes a lignocellulosic biomass based process for production of:
non-oxidized, non-degraded and uncombined lignins with a controlled aliphatic hydroxyl content and controlled phenolic hydroxyl content; and
synthetic gas
the process comprising the following steps:
a) extracting lignins and hemicellulose by putting at least one solid lignocellulosic raw material in the presence of a mixture, composed of at least water and formic acid, at atmospheric pressure under controlled conditions of temperature between 80° C. and 110° C., with a dilution ratio of the at least one solid lignocellulosic raw material/liquid mixture comprised between 1 and 15, and for a determined period of time, depending on the nature of the at least one lignocellulosic raw material;
b) fractionating, at atmospheric pressure, the primary solid fraction and the primary liquid fraction obtained at the end of the preceding extraction step a);
c) recovering by evaporation-condensation of all or part of organic acids contained in the primary liquid fraction and obtaining an intermediate liquid fraction;
d) separating the lignins from the intermediate liquid fraction, for example by precipitation by adding water, and obtaining a residual liquid fraction;
e) gasifying at least part of the primary solid fraction and/or at least part of the residual liquid fraction for producing synthetic gas.

According to some aspects of the invention:
the gasification step e) consists in gasifying at least part of the primary solid fraction and at least part of the residual liquid fraction for producing synthetic gas;
the gasification step e) consists in gasifying the primary solid fraction and the residual liquid fraction for producing synthetic gas;

the mixture is composed only of water and of formic acid;
the mixture is composed of at least water, formic acid and acetic acid in very small amounts, including at least acetic acid generated during the extraction step a);
the temperature is between 80° C. and 90° C., preferably equal to 85° C.;
during the extraction step a), the at least one solid lignocellulosic raw material is put in the presence of the mixture for a period of time comprised between 2 hours and 6 hours.

The invention also proposes a lignocellulosic biomass based process for production of energy by directly or indirectly using synthetic gas produced during the gasification step e) of the process according to the invention.

The invention also proposes a lignocellulosic biomass based process for production of electricity by directly or indirectly using synthetic gas produced during the gasification step e) of the process according to the invention.

The invention also proposes an energy production efficient synthetic gas produced during the gasification step e) of the process according to the invention, more particularly an energy production efficient synthetic gas composed of equimolar amounts of hydrogen and carbon monoxide.

BRIEF DESCRIPTION OF THE DRAWINGS

The present invention will be described in conjunction with reference to the attached drawing which schematically illustrates the main steps of an example of a production process according to the invention.

DETAILED DESCRIPTION OF THE PREFERRED EMBODIMENTS

All biomass contains cellulose, hemicellulose and lignin in varying percentages, along with inorganic components which are the source of ash. Cellulose is a straight-chain polymer comprising anhydroglucopyranose joined with ether bonds. Hemicellulose is an amorphous polysaccharide containing sugar units which are branched and have varied sugar types. Lignin is the most complex constituent and is a polymer structure of phenylpropane units.

The most prominent constituent of biomass is lignocellulose, which consists of the non-starch, fibrous part of plant material. Cellulose, hemicellulose and lignin are the three main elements of lignocellulosic biomass. The cellulose-to-lignin ratio may vary and the proportion of cellulose and hemicellulose are directly related to the gaseous products yield, while the lignin content determines the pyrolysis oil in the product.

It has been identified that cellulose, hemicellulose and lignin fractions present in biomass feedstocks degrade at different temperature ranges during gasification. The variation in these constituents in biomass raw materials yields products with different calorific values. Gasification of pure cellulose does not yield water-soluble tars in the early stages.

This appears to be the consequence of the inhibition of the thermal polymerization by lignin during lignin/cellulose interactions in pyrolysis.

The rate of pyrolysis is thus directly related to cellulose fractions and inversely dependent upon lignin content in the feedstock.

An example of extraction according to the invention of lignins from a biomass Lignocellulosic Raw Material (LRM) using a mixture of water and formic acid (HCOOH) at low temperature and atmospheric pressure is as follows.

The first step consisted in preparing a solution of formic acid in water using a ratio in weight of 85% of formic acid and 15% of water.

In a second step, 30 grams of a dried sample of lignocellulosic feedstock (LRM) and 270 grams of the liquid mixture of formic acid in water have been introduced in in a 500 milliliters glass reactor.

The liquid/solid mass ratio (Dilution ratio) was thus, for example, equal to 9/1.

In order to increase the contact surface between liquid and solid, the lignocellulosic raw material sample can be crushed.

At the ambient/atmospheric pressure and using an oil bath, the mixture of the acid/water solution and of the biomass lignocellulosic raw material sample is heated at a temperature between 80° C.-90° C.

This mixture is thus stirred using a mechanical stirrer with an Inox anchor to have a homogenous temperature.

Using a thermometer, the temperature has been stabilized at 85° C.

At this stabilized temperature, the reaction started and has been maintained for 4 hours.

This extraction step is a very low energy consuming step (working at a low temperature under 110° C.).

At the end of this period of time of reaction, the content of the reactor has been cooled to the ambient temperature and it contains a solid fraction and a liquid fraction.

The content of the reactor has then been filtered to separate the raw solid cellulose (constituting the Primary Solid Fraction PSF in the sense of the invention) from the liquid phase of the content constituting a first portion P1 of the Primary Liquid Fraction PLF in the sense of the invention.

The separated cellulose has been washed with formic acid and then pressed and filtered to remove, in a liquid form, a second portion P2 of the of the primary liquid fraction PLF in the sense of the invention.

First portion P1 and second portion P2 have then been mixed together to obtain the Primary Liquid Fraction PLF.

This primary liquid fraction PLF has further been concentrated under vacuum, preferably with a heating thereof between 40° C.-50° C., at a pressure of 100 milliBar.

This concentration phase has been maintained until the moment where the dry matter content was about 50% to 60% in weight.

At this stage, all parts of the formic acid contained in the primary liquid fraction PLF are recovered and separated to obtain an Intermediate Liquid Fraction (ILF) in the sense of the invention.

It appears that some other organics acids, such as acetic acid ($CH_3CO_2H$) could be generated or produced during the extraction step starting with formic acid in very small amounts. These other acids, after recovery are used in addition to the formic acid used for the above mentioned preparation of the water-acid mixture.

In order separate or "extract" the lignins from the hemicellulose fraction in the intermediate liquid fraction ILF, warm water has been added to the Intermediate Liquid Fraction ILF for reaching a liquid/solid mass ratio, for example equal to 4/1.

With a view to enhancing the separation of the lignins from the hemicellulose fraction, for example only, a high performance rotor/stator disperser has been used during a period of dispersion comprised between 2 and 3 minutes at a rotational speed greater than 15000 revolutions/minute.

At the end of this dispersion step, it has been processed with a filtration step to separate the lignins from the hemicellulose fraction and to obtain a Residual Liquid Fraction RLF in the sense of the invention.

The separated lignins have then been washed with warm water until a neutral pH of the filtrate has been reached.

The lignins have then been crushed and dried until reaching 94% of dry matter in weight, the drying temperature being not greater than 40° C.

At this stage the process has permitted the obtaining of:
A) non-oxidized, non-degraded and uncombined lignins with a controlled aliphatic hydroxyl content and controlled phenolic hydroxyl content; and
B) a "compound" or mix comprising the primary solid fraction PSF and the residual liquid fraction RLF, that is available for direct gasification for production of syngas for production of energy, for example in the form of electricity.

This compound of PSF+RLF available for gasification is ready for gasification in the sense that:
i) it does not contain any lignins, or in a much reduced proportion, that have been identified as inhibitor of the gasification process;
ii) the gasification process is conducted on a compound containing only sugars;
iii) the sugars in the compound are in the most favorable H/C proportion for obtaining a synthetic gas having its optimal and maximum chemical and energetic efficiency, i.e., composed of equimolar amounts of carbon monoxide CO and of hydrogen $H_2$;
iv) for producing electricity from the syngas obtained by gasification of the compound, syngas clean-up stages are no longer necessary, or are reduced to their minimum, as well as the problems inherent to the presence or ashes which are also avoided, or reduced when compared, for instance, with known electricity production process using syngas obtained by direct gasification of the biomass (Biomass Gasification) or of material obtained from starting lignocellulosic raw material, for example through known organosolv process, but containing lignins and/or hemicellulose.

In view of the above mentioned characteristics of the compound for gasification according to the invention and of the characteristics and qualities of the synthetic gas obtained starting from this compound, for the efficient production of electricity, the synthetic gas obtained according to the invention can be called "E2 Syngas" for "Electricity Efficient Syngas" or "Energy Efficient Syngas".

On this basis, the invention proposes to use the "E2 Syngas" as a non-fossil power source for producing electricity, i.e., for producing electricity from renewable lignocellulosic biomass feedstocks.

As illustrated in the attached drawing, before producing electricity or any other energy, such as steam for example, the syngas can be stored, preferably directly without any transformation nor any addition, in order to safeguard its high efficiency properties for producing electricity.

The process according to the invention can be industrially implemented using a batch technique for the extraction step a), also including stirring of the content of each batch.

This is advantageous when compared with diffusion techniques that imply long and energy consuming extraction periods.

This is also advantageous when compared with diffusion techniques that imply specific "calibration" preparation steps of the lignocellulosic Raw material (LRM) by cutting, crushing, micronizing, etc., depending on the plant waste used as raw material.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A lignocellulosic biomass based process for production of:
   non-oxidized, non-degraded and uncombined lignins with a controlled aliphatic hydroxyl content and controlled phenolic hydroxyl content; and
   synthetic gas
   said process comprising the following steps:
   a) extracting lignins and hemicellulose by putting at least one solid lignocellulosic raw material in the presence of a mixture, composed of at least water and formic acid, at atmospheric pressure under controlled conditions of a first temperature between 80° C. and 90° C., with a dilution ratio of said at least one solid lignocellulosic raw material/liquid mixture comprised between 1 and 15, and for a determined period of time to extract the lignins and the hemicellulose from the at least one solid lignocellulosic raw material, wherein the formic acid comprises 85 wt % of the mixture;
   b) fractionating, at atmospheric pressure, a primary solid fraction and a first portion of a primary liquid fraction obtained at an end of the preceding extracting step a) and washing the primary solid fraction with formic acid to provide a second portion of the primary liquid fraction and combining the first portion and the second portion of the primary liquid fraction;
   c) concentrating the primary liquid fraction under vacuum at a second temperature between 40° to 50° C. until the primary liquid fraction comprises a dry matter content of 50 to 60 wt % and then separating all or part of organic acids contained in said primary liquid fraction and obtaining an intermediate liquid fraction;
   d) separating the lignins from said intermediate liquid fraction by diluting the intermediate liquid fraction with water and then filtering to recover the lignins and obtain a residual liquid fraction; and,
   e) gasifying at least one of at least part of said primary solid fraction or at least part of said residual liquid fraction for producing synthetic gas.

2. The process according to claim 1, wherein said gasifying step e) consists in gasifying at least part of said primary solid fraction and at least part of said residual liquid fraction for producing synthetic gas.

3. The process according to claim 2, wherein said gasifying step e) consists in gasifying said primary solid fraction and said residual liquid fraction for producing synthetic gas.

4. The process according to claim 1, wherein said mixture is composed only of water and of formic acid.

5. The Process according to claim 1, wherein said mixture is composed of at least water, formic acid and acetic acid in very small amounts, including at least acetic acid generated during the extracting step a).

6. The process according to claim 1, wherein, during said extracting step a), said at least one solid lignocellulosic raw material is put in the presence of said mixture for a period of time comprised between 2 hours and 6 hours.

7. The process according to claim 1 further comprising:
   producing energy by directly or indirectly using the synthetic gas produced during the gasifying step e) of claim 1.

8. The process according to claim 1 further comprising:
   producing electricity by using the synthetic gas produced during the gasifying step e).

9. The process according to claim 1 wherein the synthetic gas comprises equimolar amounts of hydrogen and carbon monoxide.

10. The process according to claim 1, wherein said first temperature is 85° C.

11. The process according to claim 1, further comprising:
    f) drying the lignin recovered in step d) at a temperature no greater than 40° C.

12. The process of claim 11, wherein step f) further comprises:
    crushing the lignin recovered in step d).

* * * * *